US012131844B2

(12) United States Patent
Guo et al.

(10) Patent No.: US 12,131,844 B2
(45) Date of Patent: Oct. 29, 2024

(54) CABLE

(71) Applicants: Tyco Electronics (Shanghai) Co. Ltd., Shanghai (CN); TE Connectivity Services GmbH, Schaffhausen (CH)

(72) Inventors: Zhiwei (Jack) Guo, Dongguan (CN); Hainan (Harlan) Lu, Dongguan (CN); Jonathan Edward Lee, Middletown, PA (US)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 0 days.

(21) Appl. No.: 17/668,092

(22) Filed: Feb. 9, 2022

(65) Prior Publication Data

US 2022/0270782 A1 Aug. 25, 2022

(30) Foreign Application Priority Data

Feb. 9, 2021 (CN) ......................... 202110180885.8

(51) Int. Cl.
*H01B 7/08* (2006.01)
*H01B 7/02* (2006.01)
*H01B 11/00* (2006.01)
*H01B 11/18* (2006.01)

(52) U.S. Cl.
CPC ......... *H01B 7/0216* (2013.01); *H01B 11/002* (2013.01); *H01B 11/1847* (2013.01)

(58) Field of Classification Search
CPC .......... H01B 7/02; H01B 7/0216; H01B 7/04; H01B 7/06; H01B 7/08; H01B 7/0838; H01B 7/34; H01B 11/002; H01B 11/1847; H01B 11/1891; H01B 11/203; H01B 11/06; H01B 11/20
USPC ............ 174/36, 110 R, 113 R, 117 R, 117 F, 174/117 FF
See application file for complete search history.

(56) References Cited

U.S. PATENT DOCUMENTS 3,032,604 A * 5/1962 Timmons ........... H01B 11/1016 174/115
5,434,354 A * 7/1995 Baker ................ H01B 11/1091 174/115
5,483,020 A * 1/1996 Hardie ................. H01B 11/203 174/102 R
6,403,887 B1 * 6/2002 Kebabjian .......... H01B 11/1025 174/113 R
6,740,808 B1 * 5/2004 Chang .................. H01B 7/0861 174/113 R (Continued)

FOREIGN PATENT DOCUMENTS

CA 2954080 C * 1/2016 ............. H01B 11/06
JP 2001-093357 A * 4/2001 ............. H01B 11/08
JP 2007-26909 A * 2/2007 ............. H01B 11/04

*Primary Examiner* — William H. Mayo, III
(74) *Attorney, Agent, or Firm* — Barley Snyder

(57) ABSTRACT

A cable has a pair of insulated core wires extending parallel to each other in a longitudinal direction. Each of the insulated core wires includes a central conductor and a core insulation layer wrapped around the central conductor in a circumferential direction. A first metal shielding layer is wrapped around the pair of insulated core wires. A second metal shielding layer is wrapped around the first metal shielding layer. An outer insulation layer is wrapped around an outer circumferential surface of the second metal shielding layer.

20 Claims, 3 Drawing Sheets

(56) References Cited

U.S. PATENT DOCUMENTS

| | | | | |
|---|---|---|---|---|
| 9,159,472 | B2 * | 10/2015 | Nordin | H05K 9/0081 |
| 9,355,755 | B2 * | 5/2016 | Gundel | H01B 11/1856 |
| 10,438,724 | B2 * | 10/2019 | Dettmer | H01B 11/002 |
| 10,573,434 | B2 * | 2/2020 | Kobayashi | H01B 11/1895 |
| 10,950,367 | B1 * | 3/2021 | Baechtle | H01B 11/1016 |
| 2011/0083877 | A1 * | 4/2011 | Sugiyama | H01B 7/0823<br>427/117 |
| 2012/0145429 | A1 * | 6/2012 | Nordin | H01B 11/20<br>174/34 |
| 2015/0075838 | A1 * | 3/2015 | Buck | H01B 7/303<br>174/103 |
| 2015/0228378 | A1 * | 8/2015 | Guetig | H01B 7/0838<br>174/32 |

* cited by examiner

CABLE

CROSS-REFERENCE TO RELATED APPLICATIONS

This application claims the benefit of Chinese Patent Application No. 202110180885.8 filed on Feb. 9, 2021 in the China National Intellectual Property Administration, the whole disclosure of which is incorporated herein by reference.

FIELD OF THE INVENTION

The present disclosure relates to a cable, and in particular to a cable such as a twin-axial cable for enabling data transmission at a high data transmission rate.

BACKGROUND

A conventional high-speed data transmission cable mainly includes a pair of insulated core wires, a drain wire located between the insulated core wires, a metal shielding layer wrapped around the insulated core wires and the drain wire, and an insulation layer wrapped around the metal shielding layer. However, a high-frequency test bandwidth achievable by such the conventional cable is low. Moreover, as the core wires are fixed only by one insulation layer, the insulated core wires, as well as the drain wire, are easily displaced, and have poor performance stability. Further, the metal shielding layer is easily broken during bending movements, resulting in poor high-frequency performance. The electromagnetic shielding effect of one metal shielding layer is also insufficient.

SUMMARY

According to an embodiment of the present disclosure, a cable comprises a pair of insulated core wires extending parallel to each other in a longitudinal direction. Each of the insulated core wires includes a central conductor and a core insulation layer wrapped around the central conductor in a circumferential direction. A first metal shielding layer is wrapped around the pair of insulated core wires. A second metal shielding layer is wrapped around the first metal shielding layer. An outer insulation layer is wrapped around an outer circumferential surface of the second metal shielding layer.

BRIEF DESCRIPTION OF THE DRAWINGS

The invention will now be described by way of example with reference to the accompanying Figures, of which.

DETAILED DESCRIPTION OF THE EMBODIMENTS

Figure 1:
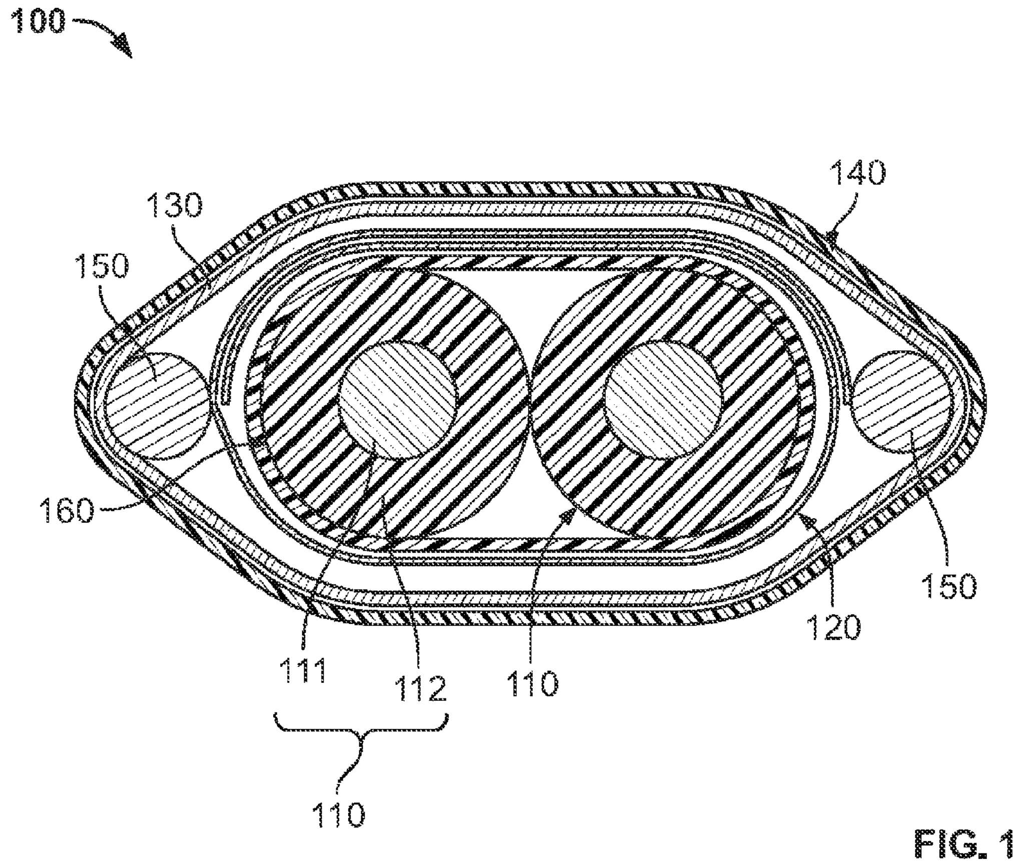
FIG. 1 shows a radial cross-sectional view schematically illustrating a structure of a cable according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIG. 1, according to an exemplary embodiment of the present disclosure, a cable 100 (e.g., a twin-axial, biaxial cable or a differential cable) is configured to transmit data at a relatively high transmission rate, for example a transmission rate higher than 10 Gbps, such as 20 Gbps to 40 Gbps. The cable 100 according to the exemplary embodiment of the present disclosure includes a pair of insulated core wires 110 for signal or data transmission. The pair of insulated core wires 110 extend parallel to each other in a longitudinal direction. Rach of the insulated core wires 110 comprises a central conductor 111 and a core insulation layer 112 wrapped around the central conductor 111 in a circumferential direction. For example, the core insulation layer 112 may be in the form of an insulation material strip or tape and wound around the central conductor 111 in the longitudinal direction. The central conductor may be made of a high-conductivity material such as a copper conductor or a silver-plated wire, and the core insulation layer may be made of an insulation polymer material such as polyolefin.

As illustrated, the cable 100 according to the embodiment of the present disclosure further comprises a metal shielding layer and an outer insulation layer 140. The metal shielding layer is configured to shield signals or data transmitted over the insulated core wires 110 from an external electromagnetic interference. In an embodiment of the present disclosure, the cable includes two shielding layers, e.g., a first metal shielding layer 120 and a second metal shielding layer 130 arranged sequentially from inside to outside. The first metal shielding layer 120 is wrapped around the pair of insulated core wires 110 in the circumferential direction to provide an electromagnetic shielding effect. The second metal shielding layer 130 is wrapped around the first metal shielding layer 120 in the circumferential direction to provide an improved electromagnetic shielding effect. The outer insulation layer 140 is wrapped around an outer circumferential surface of the second metal shielding layer 130 in the circumferential direction. Therefore, the cable is provided with two shielding layers resulting in improved stable bandwidth performance, increased high-frequency bending resistance and better electromagnetic shielding effect.

In addition, in the event of joints or gaps in the first metal shielding layer and the second metal shielding layer, the joint or gap of the first metal shielding layer and the joint or gap of the second metal shielding layer are located at different angular positions with respect to the same core wire. In this way, the joints or gaps of the first metal shielding layer and the second metal shielding layer are staggered or not overlapped with each other in a radial direction. Therefore, even if the joints or gaps of the first metal shielding layer and the second metal shielding layer are separated from or misaligned with each other during bending use, the combination of the first metal shielding layer and the second metal shielding layer still provides a complete or continuous electromagnetic shielding effect.

The first metal shielding layer 120 may be in the form of a shielding strip and wound around the insulated core wires 110 in the longitudinal direction. The second metal shielding layer 130 may also be in the form of a shielding strip and wound around the first metal shielding layer 120 in the longitudinal direction. The second metal shielding layer 130 may include a conductive layer partially bonded to an outer circumferential surface of the first metal shielding layer by an adhesive. Alternatively, fillers may be provided between the conductive layer and the first metal shielding layer 120, which can further improve the stability of the cable 100. As an example, the conductive layer of the metal shielding layer is made of aluminum or copper. For example, the conductive layer may be an aluminum/polypropylene strip. However, it will be understood by those skilled in the art that the conductive layer of the metal shielding layer may also be made of other conductive materials in other embodiments of the present disclosure.

The outer insulation layer 140 is wrapped around the outer circumferential surface of the second metal shielding layer 130. The outer insulation layer may also be in the form of an insulation material strip and wound around the metal shielding layer in the longitudinal direction. The outer insulation layer may be bonded to the outer circumferential surface of the second metal shielding layer through a thermal fusion melting or by an adhesive. The outer insulation layer may be made of an insulation material such as polyester, polypropylene, polyethylene terephthalate (PET). In some examples, the outer insulation layer may be formed by stacking a plurality of sub-insulation layers to enhance a flexibility of the cable during the bending use.

Figure 2:
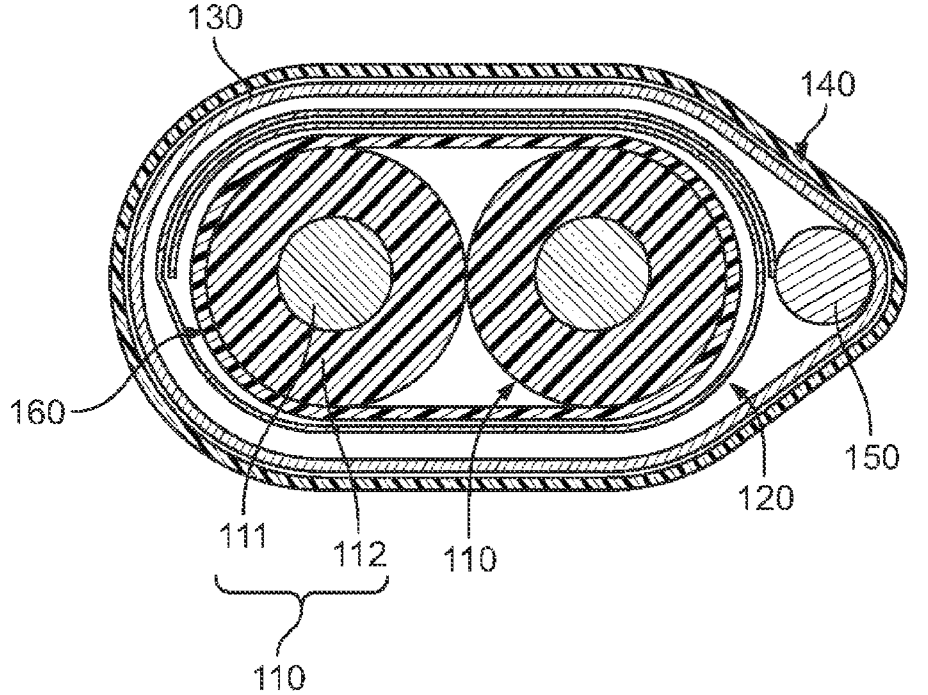
FIG. 2 shows a radial cross-sectional view schematically illustrating a structure of a cable according to another exemplary embodiment of the present disclosure.
Figure 3:
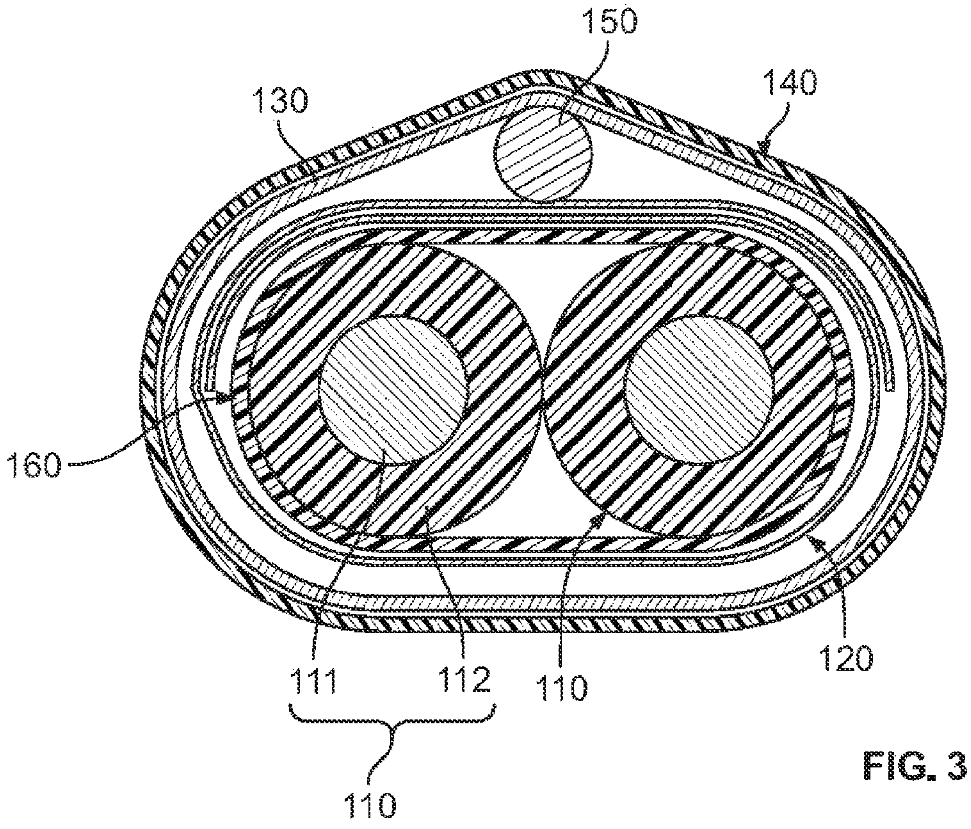
FIG. 3 shows a radial cross-sectional view schematically illustrating a structure of a cable according to a further another exemplary embodiment of the present disclosure.

In some embodiments, as shown in FIGS. 1-3, the cable 100 further comprises a drain wire 150. The drain wire 150 is, for example, disposed between the first metal shielding layer 120 and the second metal shielding layer 130 and adapted to be pressed against the outer circumferential surface of the first metal shielding layer 120 by the second metal shielding layer 130. As an example, the drain wire 150 may be in electrical contact with at least one of the first metal shielding layer 120 and the second metal shielding layer 130, for example in electrical contact with the conductive layer of the metal shielding layer.

FIGS. 1 and 2 illustrate an embodiment wherein the drain wire 150 is located at a radial outer side of the pair of insulated core wires 110. In the embodiment illustrated in FIG. 1, the cable includes two drain wires 150, which are located at opposite radial outer sides of the pair of insulated core wires 110, respectively. In the embodiment illustrated in FIG. 2, the cable includes a single drain wire 150, which is located at an outer side of one of the pair of insulated core wires 110 facing away from the other of the pair of insulated core wires in the radial direction. For example, a center of the central conductor 111 of each of the pair of insulated core wires 110 is located in the same radial plane as a center of the drain wire 150, and the center of the drain wire 150 is located outside of the center of the central conductor 111 of a corresponding one of the pair of insulated core wires 110 in the radial direction.

In the embodiment illustrated in FIG. 3, the cable 100 comprises a single drain wire 150. The drain wire 150 is located between the centers of the two central conductors 111 of the pair of insulated core wires 110 in a first direction parallel to a virtual line extending between the centers of the central conductors 111 of the pair of insulated core wires 110. For example, the single drain wire 150 is centered relative to the centers of the two central conductors 111 of the pair of insulated core wires 110 in the first direction. The single drain wire 150 shown in FIG. 3 is located at the same side of the two insulated core wires 110. It will be understood that in other embodiments, in addition to the drain wire 150 shown in FIG. 3, another drain wire may be provided at the opposite side of the two insulated core wires. That is, the cable may include two drain wires respectively located at two opposite sides of the two insulated core wires in a second direction perpendicular to the first direction.

Figure 4:
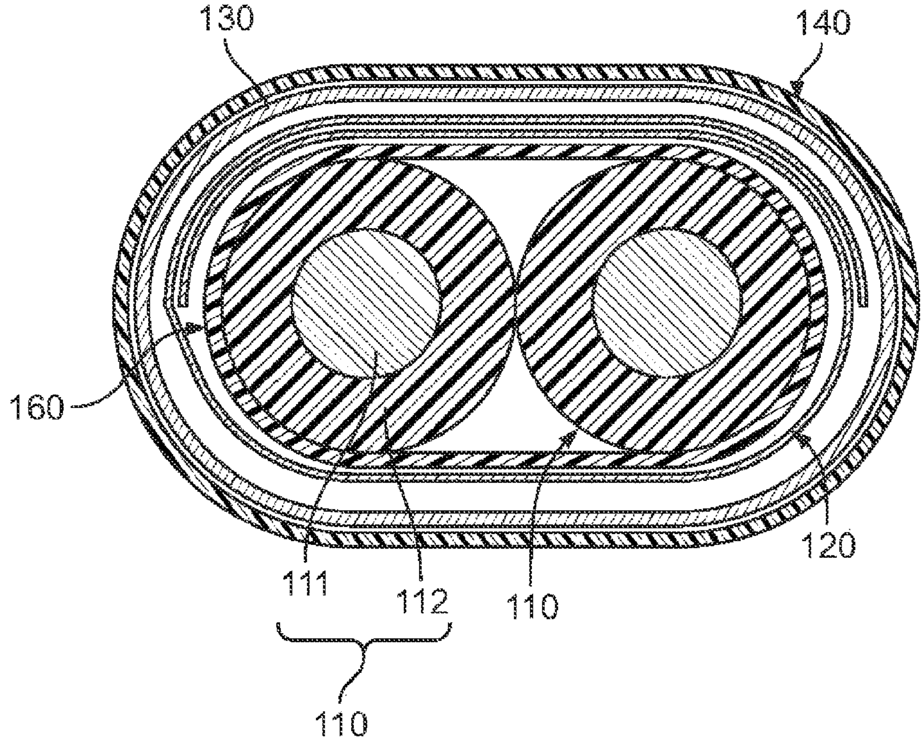
FIG. 4 shows a radial cross-sectional view schematically illustrating a structure of a cable according to a yet another exemplary embodiment of the present disclosure.

In some embodiments of the present disclosure, at least one of the second metal shielding layer 130 and the first metal shielding layer 120 may be used as a drain wire suitable for electrical connection with an external ground. For example, as shown in FIG. 4, the cable is not provided with a separate drain wire, and the second metal shielding layer 130 or the first metal shielding layer 120 can also serve as the drain wire, thereby providing a cable with a more regular outer contour. As an example, the second metal shielding layer may be directly wrapped around the outer circumferential surface of the first metal shielding layer. Alternatively, an adhesive or fillers may be provided between the second metal shielding layer 130 and the first metal shielding layer 120.

In some embodiments of the present disclosure, the cable 100 may further include an inner insulation layer 160. The insulation layer 160 may be wrapped around the core insulation layers 112 of the pair of insulated core wires 110, for example, partially wrapped around outer circumferential surfaces of the core insulation layers 112. The insulation layer 160 fixes the pair of insulated core wires 110, such that the core insulation layers 112 of the pair of insulated core wires 110 abut against each other on outer circumferential surfaces thereof at sides facing toward each other. As illustrated, the first metal shielding layer 120 is wrapped around the inner insulation layer 160, for example, wrapped around an outer circumferential surface of the inner insulation layer 160 in the longitudinal direction. Compared with a conventional cable, as the inner insulation layer is additionally provided between the metal shielding layer and the insulated core wires to fix the insulated core wires, the insulated core wires can be protected from being displaced during use, for example during the bending use, so as to improve the performance stability of the cable.

For example, the inner insulation layer 160 may be in the form of an insulation material strip and wound around the core insulation layers 112 of the pair of insulated core wires 110 in the longitudinal direction. For example, the inner insulation layer may be bonded directly to portions of outer circumferential surfaces of the core insulation layers of the pair of insulated core wires, for example, through the thermal fusion. In other examples, the inner insulation layer may be bonded to the portions of the outer circumferential surfaces of the core insulation layers of the pair of insulated core wires, for example, by an adhesive. The inner insulation layer is made of an insulation polymer material. For example, the inner insulation layer may be made of an insulation material such as polytetrafluoroethylene (PTFE), polyethylene terephthalate (PET). In some examples, fillers may be provided within a space defined between the core wire insulation layers 112 of the pair of insulated core wires 110 and the inner insulation layer 160 so as to provide a flexibility of the cable during the bending use and to further avoid the insulated core wires from being displaced during use.

Figure 5:
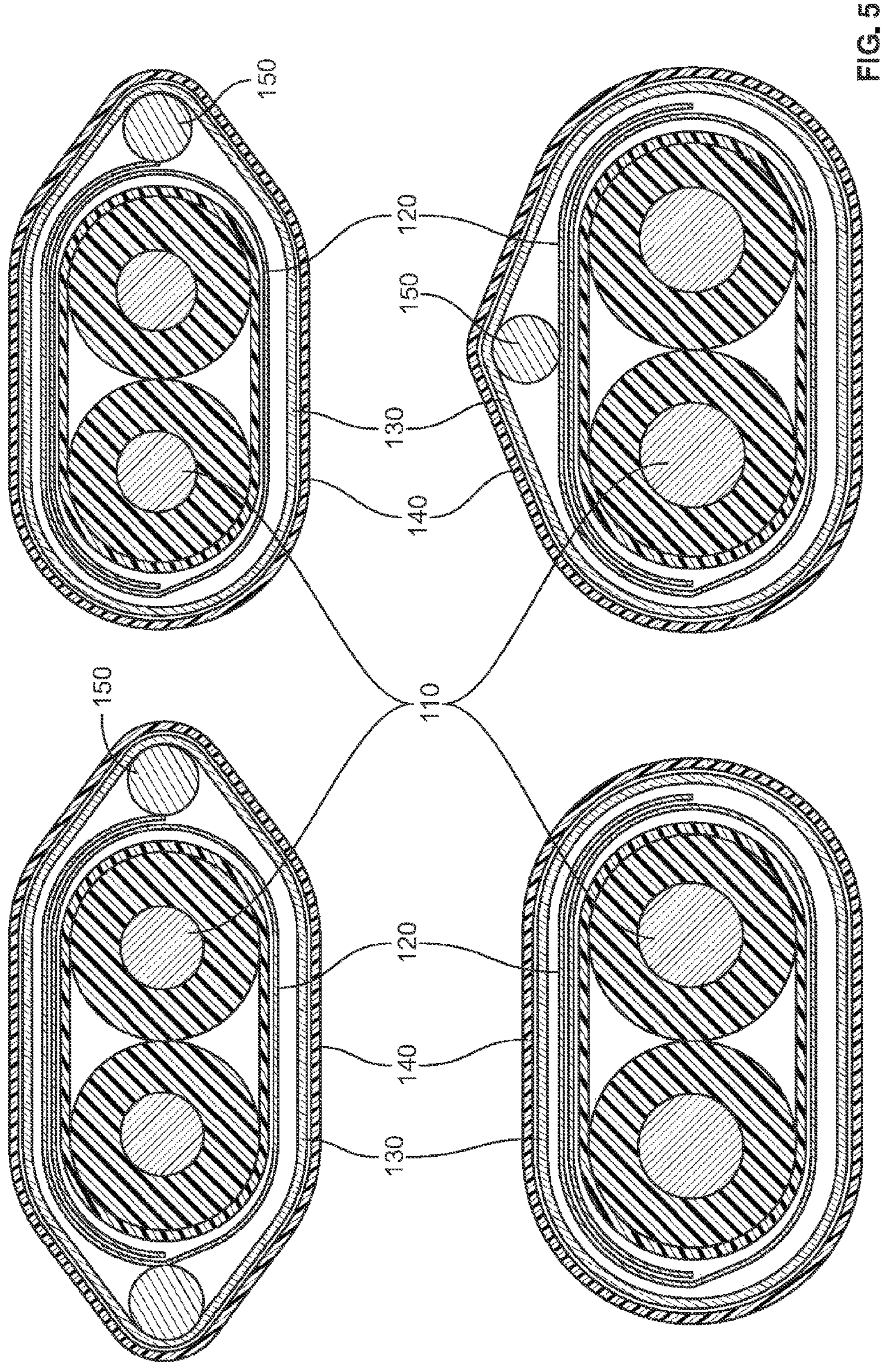
FIG. 5 shows radial cross-sectional views schematically illustrating a structure of a cable according to various exemplary embodiment of the present disclosure.

The presence of the inner insulation layer 160 can prevent the metal shielding layer from entering a gap between the insulated core wires. For example, the first metal shielding layer may be directly bonded to the outer circumferential surface of the inner insulation layer through thermal fusion, or it may be bonded by an adhesive. For example, the first metal shielding layer may include a conductive layer bonded to the inner insulation layer by an adhesive, or fillers may be provided between the conductive layer and the inner insulation layer, which can further improve the stability of the cable. In some embodiments, as shown in FIG. 5, such an inner insulation layer is not provided, and the first metal shielding layer 120 may be wrapped directly around the core wire insulating layer.

In the illustrated embodiments, the various layers/wires of the cable 100 are shown to be separated from each other or spaced apart from each other by a predetermined gap for the purpose of clearly illustrating the various layers/wires. In fact, the layers/wires of the cable are at least partially closely attached or directly bonded with each other, or suitable fillers or adhesive are provided between the layers/wires.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A cable, comprising:

a pair of insulated core wires extending parallel to each other in a longitudinal direction, each of the insulated core wires including a central conductor and a core insulation layer wrapped around the central conductor in a circumferential direction;

a first metal shielding layer;

a second metal shielding layer wrapped concentrically around the first metal shielding layer, the first metal shielding layer continuously separated from the second metal shielding layer about its circumference;

a first drain wire disposed between and directly contacting the first metal shielding layer and the second metal shielding layer;

an outer insulation layer wrapped around an outer circumferential surface of the second metal shielding layer and;

an inner insulation layer wrapped around the core insulation layers of the pair of insulated core wires to fix the pair of insulated core wires such that the core insulation layers of the pair of insulated core wires abut against each other on outer circumferential surfaces thereof at sides facing toward each other, the first metal shielding layer being discrete from the inner insulation layer and wound around an outer circumferential surface thereof in the longitudinal direction.

2. The cable according to claim 1, wherein the first drain wire is pressed against an outer circumferential surface of the first metal shielding layer by the second metal shielding layer.

3. The cable according to claim 2, wherein the first drain wire is pressed against an inner circumferential surface of the second metal shielding layer.

4. The cable according to claim 1, further comprising a second drain wire, the first and second drain wires located at opposite radial outer sides of the pair of insulated core wires, respectively.

5. The cable according to claim 4, wherein centers of the central conductors of the pair of insulated core wires are located in the same radial plane as centers of the first and second drain wires.

6. The cable according to claim 1, wherein the first drain wire is located at a side of one of the pair of insulated core wires facing away from the other of the pair of insulated core wires in a radial direction.

7. The cable according to claim 6, wherein centers of the central conductors of the pair of insulated core wires are located in the same radial plane as a center of the first drain wire.

8. The cable according to claim 1, wherein the first drain wire is located between centers of the central conductors of the pair of insulated core wires in a direction parallel to a virtual line extending between the centers of the central conductors.

9. The cable according to claim 8, further comprising a second drain wire, the first and second drain wires located at opposite radial outer sides of the pair of insulated core wires, respectively.

10. The cable according to claim 1, wherein at least one of the second metal shielding layer and the first metal shielding layer is adapted to be a drain wire suitable for electrical connection with an external ground.

11. The cable according to claim 1, wherein the outer insulation layer is directly bonded to the outer circumferential surface of the second metal shielding layer through thermal fusion melting.

12. The cable according to claim 1, further comprising filler material separating the first metal shielding layer and the second metal shielding layer in a radial direction, outside of the first drain wire the filler material arranged continuously between a conductive layer of the second metal shielding layer and a conductive layer of the first metal shielding layer in a circumferential direction.

13. The cable according to claim 1, further comprising filler material arranged between a conductive layer of the first metal shielding layer and the inner insulation layer.

14. The cable according to claim 1, further comprising filler material arranged between the core wire insulation layers and the inner insulation layer.

15. The cable according to claim 1, wherein the inner insulation layer is directly bonded to the core insulation layers of the pair of insulated core wires.

16. The cable according to claim 1, wherein the first metal shielding layer defines a first joint or a first gap, and the second metal shielding layer defines a second joint or a second gap, the first joint or the first gap and the second joint or the second gap arranged at offset angular positions with respect to each of the core wires such that they do not overlap in a radial direction.

17. A cable, comprising:

a pair of insulated core wires extending parallel to each other in a longitudinal direction, each of the insulated core wires including a central conductor and a core insulation layer wrapped around the central conductor in a circumferential direction;

a first metal shielding layer;

a second metal shielding layer wrapped concentrically around the first metal shielding layer;

filler material arranged concentrically between and separating the first metal shielding layer the second metal shielding layer;

an outer insulation layer wrapped around an outer circumferential surface of the second metal shielding layer;

a first drain wire disposed between and directly contacting the first metal shielding layer and the second metal shielding layer, the first drain wire is located at a side of one of the pair of insulated core wires facing away from the other of the pair of insulated core wires in a radial direction, centers of the central conductors of the pair of insulated core wires are located in the same radial plane as a center of the first drain wire; and an inner insulation layer wrapped around and directly bonded to the core insulation layers of the pair of insulated core wires to fix the pair of insulated core wires such that the core insulation layers of the pair of insulated core wires abut against each other on outer circumferential surfaces thereof at sides facing toward each other, the first metal shielding layer being discrete from the inner insulation layer and wound around an outer circumferential surface thereof in the longitudinal direction.

18. The cable according to claim 17, further comprising a second drain wire, the first and second drain wires located at opposite radial outer sides of the pair of insulated core wires, respectively.

19. The cable according to claim 18, wherein centers of the central conductors of the pair of insulated core wires are located in the same radial plane as centers of the first and second drain wires.

20. A cable, comprising:

a pair of insulated core wires extending parallel to each other in a longitudinal direction, each of the insulated core wires including a central conductor and a core insulation layer wrapped around the central conductor in a circumferential direction;

a first metal shielding layer wrapped around the pair of insulated core wires;

a second metal shielding layer wrapped concentrically around the first metal shielding layer;

filler material arranged concentrically between and separating the first metal shielding layer the second metal shielding layer;

an outer insulation layer wrapped around an outer circumferential surface of the second metal shielding layer;

a first drain wire disposed between and directly contacting the first metal shielding layer and the second metal shielding layer, the first drain wire is located between centers of the central conductors of the pair of insulated core wires in a direction parallel to a virtual line extending between the centers of the central conductors; and an inner insulation layer wrapped around and directly bonded to the core insulation layers of the pair of insulated core wires to fix the pair of insulated core wires such that the core insulation layers of the pair of insulated core wires abut against each other on outer circumferential surfaces thereof at sides facing toward each other, the first metal shielding layer being discrete from the inner insulation layer and wound around an outer circumferential surface thereof in the longitudinal direction.

* * * * *